(12) United States Patent
Hord et al.

(10) Patent No.: X4050
(45) Date of Patent: Mar. 12, 1825

(54) FLOUR , PRESERVING

(76) Inventors: Edwin Hord; B. Browning

Edwin Hord & Basil Browning Jnr.

Letters Patent

The Schedule referred to in these Letters Patent and making part of the same, containing a description in the words of the said Edwin Hord & Basil Browning Junr. themselves of their improvement in preserving flour for exportation and for domestic use, The Barrel is first to be prepared by saturating the inside of it with a strong solution of salt, or salt and allum, five parts of salt and one of allum, made boiling hot. - and when perfectly dry, the flour to be packed up in it with one pound of salt to the barrel mixed, through it; common salt or allum salt in preference.

Witnesses
Thos. Hord
Saml. Fitzgerald

Edward Hord
Basil Browning Junr.

Exd.
[illegible]

DRAFTSMAN'S DIVISION.

*All communications should be addressed to*
"The Commissioner of Patents,
Washington, D. C."

2—328 *a.*

*DEPARTMENT OF THE INTERIOR,*

United States Patent Office,

*Washington, D. C.,* ..........., *189*....

*SIR:*

*The printed* ........ Copies ........ *of Patent No.* [illegible] + Browning

........ are ........ *exhausted.* Mar 12 18[illegible]

*As soon as printed a copy will be mailed you to complete your order.*

*By direction of the Commissioner:*

*Very respectfully,*

.......................

*Chief Clerk.*

314356-97-5m